(12) United States Patent
Seol et al.

(10) Patent No.: US 11,929,772 B2
(45) Date of Patent: Mar. 12, 2024

(54) CIRCUIT CONFIGURED TO COMPENSATE FOR TIMING SKEW AND OPERATION METHOD THEREOF

(71) Applicant: Samsung Electronics Co., Ltd., Suwon-si (KR)

(72) Inventors: Changkyu Seol, Osan-si (KR); Byung-Suk Woo, Hwaseong-si (KR); Sucheol Lee, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 7 days.

(21) Appl. No.: 17/490,563

(22) Filed: Sep. 30, 2021

(65) Prior Publication Data

US 2022/0247438 A1  Aug. 4, 2022

(30) Foreign Application Priority Data

Feb. 1, 2021  (KR) .................. 10-2021-0014311

(51) Int. Cl.
*H04B 1/10* (2006.01)
*H04B 1/00* (2006.01)
(Continued)

(52) U.S. Cl.
CPC .......... *H04B 1/1018* (2013.01); *H04B 1/0007* (2013.01); *H04B 1/1027* (2013.01); *H04B 17/21* (2015.01); *H04B 17/29* (2015.01)

(58) Field of Classification Search
CPC ............. H03M 1/1215; H03M 1/0836; H03M 1/0624; H03M 1/121; H03M 1/1245; H03M 1/1033; H03M 1/1061; H03M 1/12; H03M 1/0626; H03M 1/46; H03M 1/0609; H03M 1/1028; H03M 1/0604; H03M 1/1019; H03M 1/1009; H03M 1/1225; H03M 1/123; H03M 1/128; H03M 1/183; H03M 1/0607; H03M 1/1023; H03M 1/168;
(Continued)

(56) References Cited

U.S. PATENT DOCUMENTS 7,010,073 B2   3/2006   Black et al.
7,233,270 B2   6/2007   Lin
(Continued)

FOREIGN PATENT DOCUMENTS

KR   101018140 B1   2/2011
KR   101552755 B1   9/2015

*Primary Examiner* — Golam Sorowar
(74) *Attorney, Agent, or Firm* — Muir Patent Law, PLLC

(57) ABSTRACT

An electronic circuit converts a receive signal being analog into reception data being digital. The electronic circuit includes a delay circuit that receives a first receive signal and outputs a reference signal, the reference signal being generated by delaying the first receive signal as much as one of a plurality of different timing delays respectively set to a plurality of loops, a sampler that receives a second receive signal and samples the second receive signal based on the reference signal in each of the plurality of loops, a timing skew estimation circuit that outputs a compensation signal for compensating for a timing skew by extracting a statistical characteristic of a plurality of sample data sampled through the sampler and estimating the timing skew based on the statistical characteristic, and a controller that controls an operation of the timing skew estimation circuit.

19 Claims, 13 Drawing Sheets

(51) Int. Cl.
*H04B 17/21* (2015.01)
*H04B 17/29* (2015.01)

(58) Field of Classification Search
CPC ...... H03M 1/462; H03M 1/468; H03M 3/382; H03M 3/498; H03M 1/004; H03M 1/06; H03M 1/1038; H03M 1/126; H04L 7/0062; H04L 25/03057; H04L 7/0087; H04L 7/0054; H04L 25/03006; H04L 7/033; H04L 2025/03445; H04L 25/03159; H04L 27/38; H04L 7/0337; H04L 25/0272; H04L 25/03133; H04L 25/03203; H04L 25/14; H04L 7/0037; H04L 7/02; H04L 25/03; H04L 27/02; H04L 27/2647; H04L 47/70; H04L 5/14; H04L 7/0016; H04L 2025/03547; H04L 25/03146; H04L 25/061; H04L 7/0025; H04B 10/697; H04B 1/16; H04B 1/40; H04B 10/6933; H04B 10/6971; H04B 17/336; H04B 1/0007; H04B 1/04; H04B 1/1036; H04B 1/12; H04B 1/1607; H04B 10/25133; H04B 17/0085; H04B 17/20; H04B 2001/0433; H04B 2001/1063; H04B 3/04; H04B 1/0025; H04B 1/1027
See application file for complete search history.

(56) References Cited

U.S. PATENT DOCUMENTS

| | | | |
|---|---|---|---|
| 7,643,566 | B2 | 1/2010 | Hwang et al. |
| 7,907,682 | B2 | 3/2011 | Lim et al. |
| 8,111,739 | B1 | 2/2012 | Liu et al. |
| 9,485,039 | B1 * | 11/2016 | Malkin .................. H04B 17/14 |
| 10,015,029 | B2 | 7/2018 | Chu et al. |
| 11,081,193 | B1 * | 8/2021 | Tang ...................... G11C 16/32 |
| 2004/0161055 | A1 | 8/2004 | Sinha |
| 2006/0271611 | A1 | 11/2006 | Kim et al. |
| 2021/0036707 | A1 * | 2/2021 | Han ...................... H03L 7/0807 |

* cited by examiner

CIRCUIT CONFIGURED TO COMPENSATE FOR TIMING SKEW AND OPERATION METHOD THEREOF

CROSS-REFERENCE TO RELATED APPLICATIONS

This application claims priority under 35 U.S.C. § 119 to Korean Patent Application No. 10-2021-0014311 filed on Feb. 1, 2021, in the Korean Intellectual Property Office, the disclosure of which is incorporated by reference herein in their entireties.

BACKGROUND

Embodiments of the present disclosure described herein relate to an electronic device, and more particularly, relate to an electronic circuit configured to compensate for a timing skew to correct for a sampling timing error and an operation method thereof.

Nowadays, various kinds of electronic devices are widely being used. An electronic device performs a unique function depending on operations of a number of electronic circuits included therein. The electronic device may operate solely or may operate while communicating with any other electronic device. The electronic device may include a transmitting circuit and a receiving circuit for the purpose of communicating with any other electronic device.

The receiving circuit of the electronic device may receive data from a transmitting circuit of any other electronic device. In some cases, a receiving circuit may adopt a clock and data recovery (CDR) circuit that may recover a clock from received data and may recover data based on the recovered clock. The CDR circuit may make it possible to reduce complexity of a communication channel between the transmitting circuit and the receiving circuit and to improve a communication speed therebetween.

In an operation of the CDR circuit, a skew may occur when a signal delay of a path through which data are transmitted is different from a signal delay of a path through which a clock signal is transmitted. As such, a sampling timing for recovering data may vary depending on a timing to recover a clock. In this case, a mismatch between a timing to receive data and a timing to sample the data causes a sampling timing error. The sampling timing error may cause a bit error of recovered reception data.

SUMMARY

Embodiments of the present disclosure provide an electronic circuit capable of compensating for a timing skew by using a statistical characteristic of sampled signals in a normal operation without a training operation, and an operation method thereof.

According to an embodiment, an electronic circuit converts a receive signal being analog into reception data being digital. The electronic circuit includes a delay circuit that receives a first receive signal and outputs a reference signal, the reference signal being generated by delaying the first receive signal as much as one of a plurality of different timing delays respectively set to a plurality of loops, a sampler that receives a second receive signal and samples the second receive signal based on the reference signal in each of the plurality of loops, a timing skew estimation circuit that outputs a compensation signal for compensating for a timing skew by extracting a statistical characteristic of a plurality of sample data sampled through the sampler and estimating the timing skew based on the statistical characteristic, and a controller that controls an operation of the timing skew estimation circuit.

According to an embodiment, an electronic circuit includes a plurality of sub electronic circuits that convert a receive signal being analog into reception data being digital. Each of the plurality of sub electronic circuits includes a delay circuit that receives a first receive signal and to output a reference signal, the reference signal being generated by delaying the first receive signal as much as one of a plurality of different timing delays respectively set to a plurality of loops, a sub analog-to-digital converter (sub-ADC) that receives a second receive signal and samples the second receive signal based on the reference signal in each of the plurality of loops, an estimation circuit that outputs a compensation signal for compensating for a timing skew by extracting a statistical characteristic of sample data sampled through the sub-ADC and estimating the timing skew based on the statistical characteristic, and a loop filter that filters specific frequency components of the compensation signal.

According to an embodiment, an operation method of an electronic circuit which estimates a timing skew includes receiving a first receive signal and a second receive signal, generating a first reference signal by delaying the first receive signal as much as a first time, generating first sample data by sampling the second receive signal based on the first reference signal, generating a first output value based on a metric indicating a statistical characteristic of the first sample data, generating a second reference signal by delaying the first receive signal as much as a second time, generating second sample data by sampling the second reference signal based on the second reference signal, generating a second output value based on the metric indicating the statistical characteristic with respect to the second sample data, estimating the first time or the second time as the timing skew by comparing the first output value and the second output value, and compensating for the timing skew to output final sample data.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that one skilled in the art can easily carry out the embodiments of the present disclosure.

Figure 1:
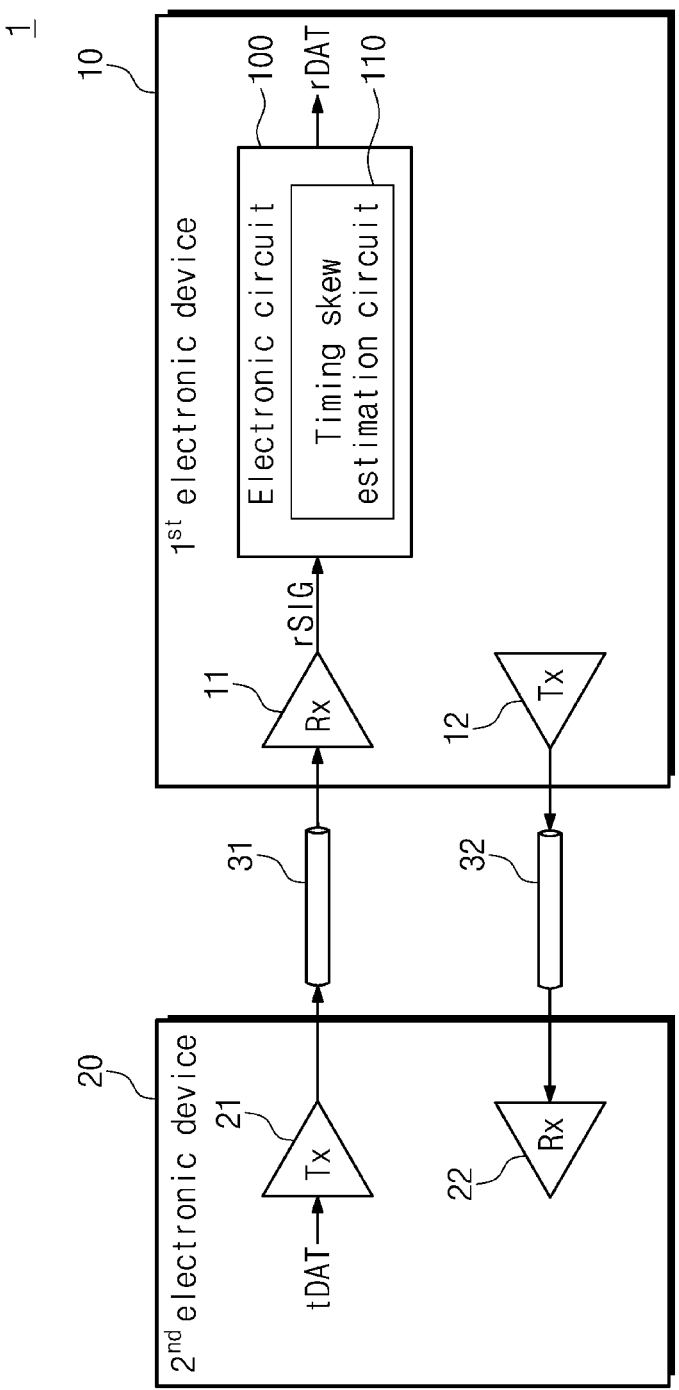
FIG. 1 is a block diagram illustrating a transceiver system according to an embodiment of the present disclosure.

FIG. 1 is a block diagram illustrating a transceiver system according to an embodiment of the present disclosure. Referring to FIG. 1, a transceiver system 1 may include a first electronic device 10 and a second electronic device 20.

In an embodiment, each of the first electronic device 10 and the second electronic device 20 may be implemented in the form of a portable communication terminal, a personal digital assistant (PDA), a portable multimedia player (PMP), a smartphone, or a wearable device or in the form of a computing device such as a personal computer, a server, a workstation, or a notebook computer. Alternatively, each of the first electronic device 10 and the second electronic device 20 may be one of various hardware components, which are included in one user device, such as a processor, a memory device, a storage device, and a control device.

The first electronic device 10 and the second electronic device 20 may exchange signals through communication channels 31 and 32. Each of the first electronic device 10 and the second electronic device 20 may include a transmitter and a receiver for the purpose of transmitting/receiving signals. For example, the first electronic device 10 may include a first receiver 11 and a first transmitter 12, and the second electronic device 20 may include a second transmitter 21 and a second receiver 22.

The first receiver 11 may receive data tDAT generated by the second electronic device 20 as a receive signal rSIG through the channel 31. The second transmitter 21 may transmit the data tDAT generated by the second electronic device 20 to the first receiver 11 through the channel 31. The first transmitter 12 may transmit data generated by the first electronic device 10 to the second electronic device 20 through the channel 32. The second receiver 22 may receive the data generated by the first electronic device 10 through the channel 32.

In an embodiment, each of the channels 31 and 32 may be a signal line (i.e., a wired communication channel) electrically connecting the first electronic device 10 and the second electronic device 20 or a wireless communication channel. For example, each of the transmitters 12 and 21 may transmit various types of signals such as an electrical signal, an optical signal, and a wireless signal, and each of the receivers 11 and 22 may receive various types of signals such as an electrical signal, an optical signal, and a wireless signal. Below, for convenience of description, it is assumed that each of the transmitters 12 and 21 and the receivers 11 and 22 operates based on an electrical signal.

According to an embodiment, in the first electronic device 10, the first receiver 11 and the first transmitter 12 are illustrated independently of each other; in the second electronic device 20, the second transmitter 21 and the second receiver 22 are illustrated independently of each other. However, in each of the first electronic device 10 and the second electronic device 20, the transmitter 12/22 and the receiver 11/21 may be implemented with one transceiver circuit.

The first electronic device 10 may further include an electronic circuit 100. The electronic circuit 100 is configured to convert the receive signal rSIG into reception data rDAT. The receive signal rSIG may have a waveform corresponding to the data tDAT generated by the second electronic device 20.

According to an embodiment, the electronic circuit 100 may receive a data signal DQ and a data strobe signal DQS. The electronic circuit 100 may convert the data signal DQ into the reception data rDAT based on the data strobe signal DQS. In this case, the data signal DQ may have a waveform corresponding to the data tDAT generated by the second electronic device 20.

Below, for convenience of description, the receive signal rSIG is described as including a data signal and a data strobe signal, but the present disclosure is not limited thereto. According to an embodiment, the receive signal rSIG includes a data signal and a clock signal. In this case, the electronic circuit 100 may be called a "clock and data recovery (CDR) circuit".

The electronic circuit 100 may include a timing skew estimation circuit 110. The timing skew estimation circuit 110 may estimate a timing skew of the receive signal rSIG. The timing skew may mean a skew between the data signal DQ and the data strobe signal DQS. The timing skew may occur when a signal delay of a path where the data signal DQ is transmitted and a signal delay of a path where the data strobe signal DQS is transmitted are different due to various factors.

The electronic circuit 100 may compensate for the timing skew estimated by the timing skew estimation circuit 110 as much as a timing corresponding to the timing skew. The electronic circuit 100 may delay the data signal DQ or the data strobe signal DQS to compensate for a timing skew as much as a timing corresponding to the timing skew. As such, the first electronic device 10 may stably receive the reception data rDAT.

Below, for brevity of description, the electronic circuit 100 is described as delaying the data strobe signal DQS as much as a timing corresponding to a timing skew, but the present disclosure is not limited thereto. For example, the electronic circuit 100 may delay the data signal DQ as much as a timing corresponding to a timing skew.

A configuration and an operation of the electronic circuit 100 described above will be described in more detail with reference to the following drawings.

Figure 2A:
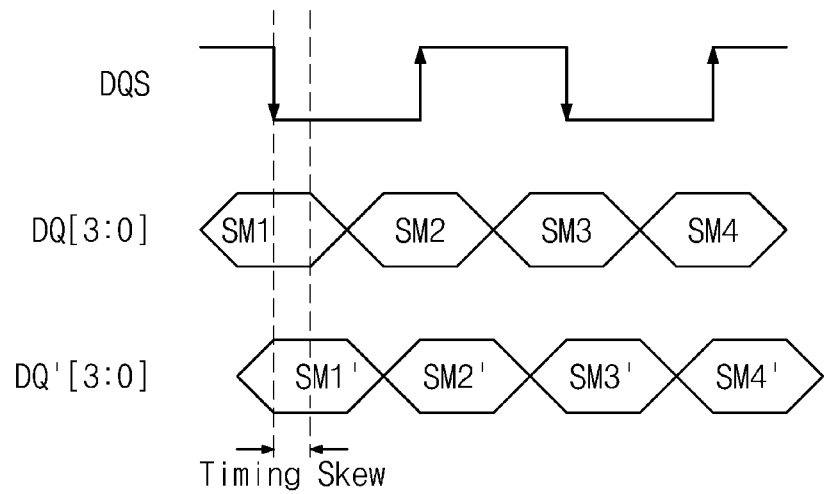
FIGS. 2A and 2B are timing diagrams for describing a timing skew.
Figure 2B:
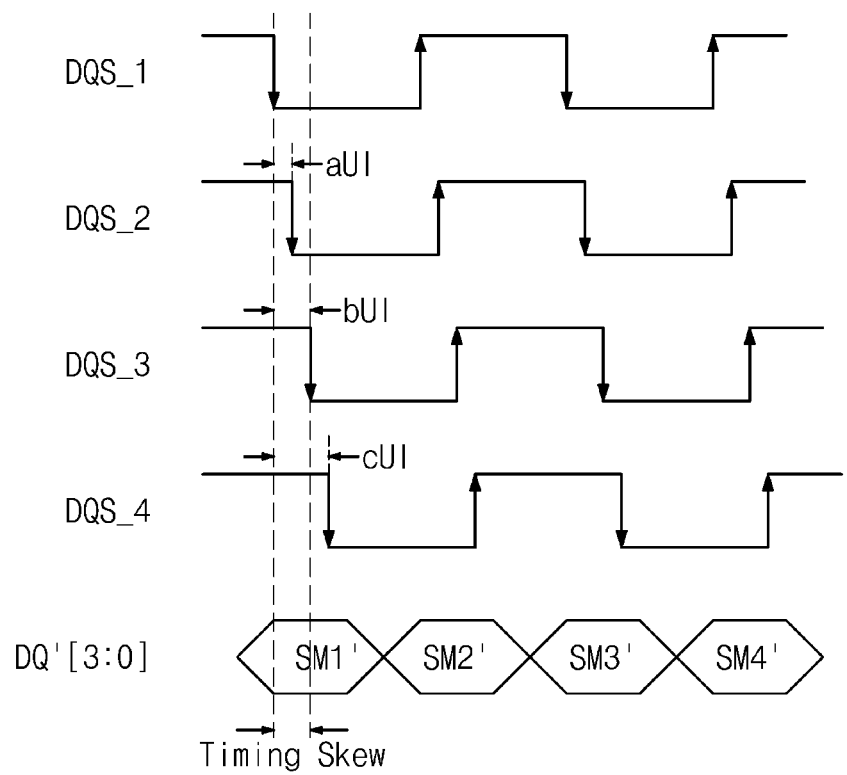

FIGS. 2A and 2B are timing diagrams for describing a timing skew. FIG. 2A is a timing diagram for describing a timing skew, according to the present disclosure, and FIG. 2B is a timing diagram for describing a method for estimating a timing skew, according to the present disclosure.

Referring to FIGS. 1 and 2A, the data strobe signal DQS may include a rising edge and a falling edge periodically. The second electronic device 20 may transmit first to fourth symbols SM1, SM2, SM3, and SM4 to the first electronic device 10 through data signals DQ[3:0]. The data signals DQ[3:0] may be signals synchronized with the data strobe signal DQS.

For example, the first symbol SM1 and the third symbol SM3 of the data signals DQ[3:0] may be synchronized with the falling edges of the data strobe signal DQS. The second symbol SM2 and the fourth symbol SM4 of the data signals DQ[3:0] may be synchronized with the rising edges of the data strobe signal DQS.

That the first to fourth symbols SM1, SM2, SM3, and SM4 are synchronized with the rising edges and the falling edges of the data strobe signal DQS may mean that the rising edge or the falling edge is located at the center of a symbol length. For example, when a length of the first symbol SM1 is a unit interval (hereinafter referred to as "1UI"), the falling edge of the data strobe signal DQS may occur after 0.5UI from a start point of the first symbol SM1.

However, due to various factors, a delay time of the data strobe signal DQS and a delay time of the data signals DQ[3:0] may be different. For example, data signals DQ'[3:0] that are actually received may be delayed with respect to the data signals DQ[3:0] being ideally synchronized signals as much as a given time (e.g., amount of time). The second electronic device 20 may transmit first to fourth symbols SM1', SM2', SM3', and SM4' through the data signals DQ'[3:0]. The first to fourth symbols SM1', SM2', SM3', and SM4' that are received may be delayed with respect to the first to fourth symbols SM1, SM2, SM3, and SM4 as much as a given time. As a result, the data signals DQ'[3:0] may not be synchronized with the data strobe signal DQS, thereby causing a timing skew as much as the given time.

The electronic circuit 100 may set a sampling timing based on the data strobe signal DQS and may sample the data signals DQ'[3:0]. However, because the data signals DQ'[3:0] are not synchronized with the data strobe signal DQS, the data signals DQ'[3:0] may be sampled at an incorrect timing. That is, a timing skew may cause a sampling timing error, thereby having a bad influence on stability of data transmission. Therefore, the electronic circuit 100 would benefit from compensating for the timing skew.

Referring to FIGS. 1, 2A, and 2B, the electronic circuit 100 may estimate a timing skew for the purpose of compensating for the timing skew. The electronic circuit 100 may estimate a timing skew while performing a loop as much as a given number of times. The electronic circuit 100 may delay the data strobe signal DQS as much as a set timing delay every loop and may determine whether the data strobe signal DQS is synchronized with the data signals DQ'[3:0].

For example, a plurality of loops may include first to fourth loops. In the first loop, the electronic circuit 100 may set a first sampling timing based on a first data strobe signal DQS_1 that is not delayed. In the second loop, the electronic circuit 100 may set a second sampling timing based on a second data strobe signal DQS_2 that is delayed as much as a first timing delay aUI. In the third loop, the electronic circuit 100 may set a third sampling timing based on a third data strobe signal DQS_3 that is delayed as much as a second timing delay bUI. In the fourth loop, the electronic circuit 100 may set a fourth sampling timing based on a fourth data strobe signal DQS_4 that is delayed as much as a third timing delay cUI.

The number of loops is not limited to a given value, that is, 4. After a given number of loops all are performed, the electronic circuit 100 may determine sample data being the most ideal from among a plurality of sample data respectively sampled at the first to fourth sampling timings. When the data signal DQ is synchronized with the data strobe signal DQS, the data signal DQ may be normally sampled. The sample data being the most ideal from among the plurality of sample data may mean data that are sampled in the state where the data signal DQ is synchronized with the data strobe signal DQS or in a state of being the closest to the case.

The electronic circuit 100 may determine the sample data being the most ideal from among the plurality of sample data by using a statistical characteristic of sample data. The statistical characteristic may include a normal distribution characteristic. The statistical characteristic will be described in more detail with reference to FIGS. 3A to 3C.

In the case of FIG. 2B, sample data sampled at the third sampling timing set based on the third data strobe signal DQS_3 may be determined as sample data being the most ideal. Alternatively, the electronic circuit 100 may determine that the data signals DQ'[3:0] are synchronized with the third data strobe signal DQS_3.

The electronic circuit 100 may estimate the second timing delay bUI corresponding to the third data strobe signal DQS_3 as a timing skew. The electronic circuit 100 may generate a compensation signal for controlling a delay such that the data strobe signal DQS has the second timing delay bUI. The compensation signal may delay the data strobe signal DQS to compensate for the timing skew.

Figure 3A:
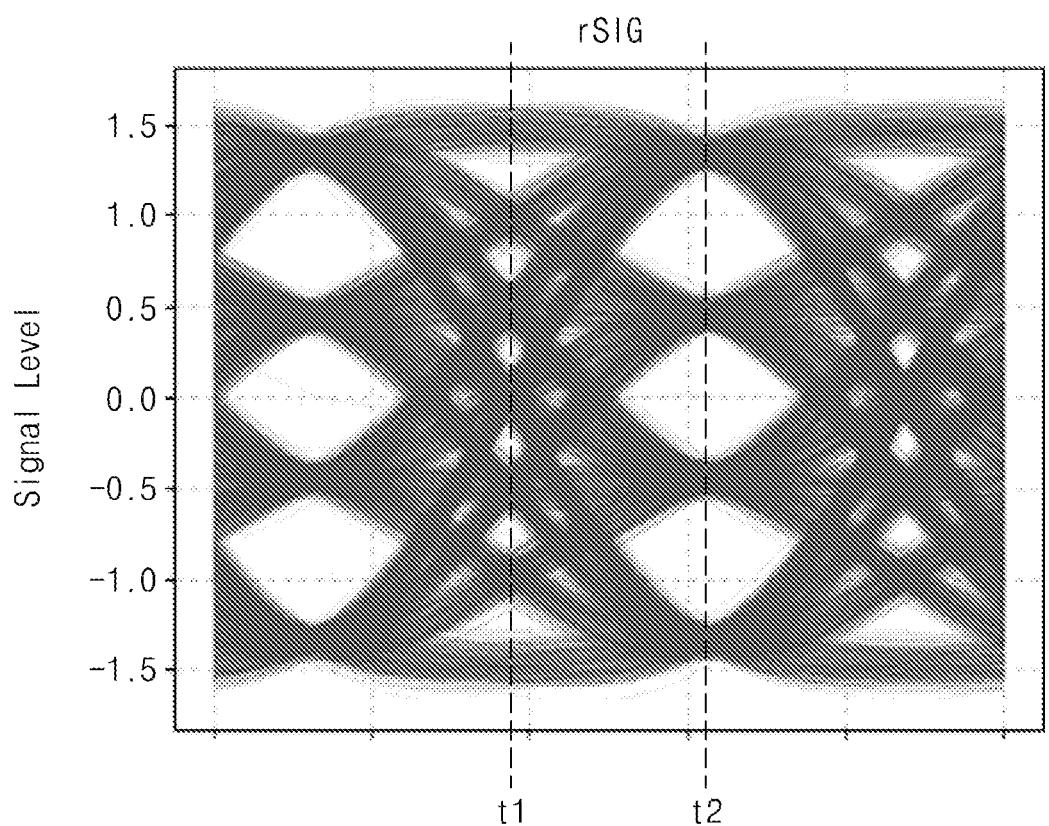
FIGS. 3A to 3C are diagrams for describing a method for estimating a timing skew, according to an embodiment of the present disclosure.
Figure 3B:
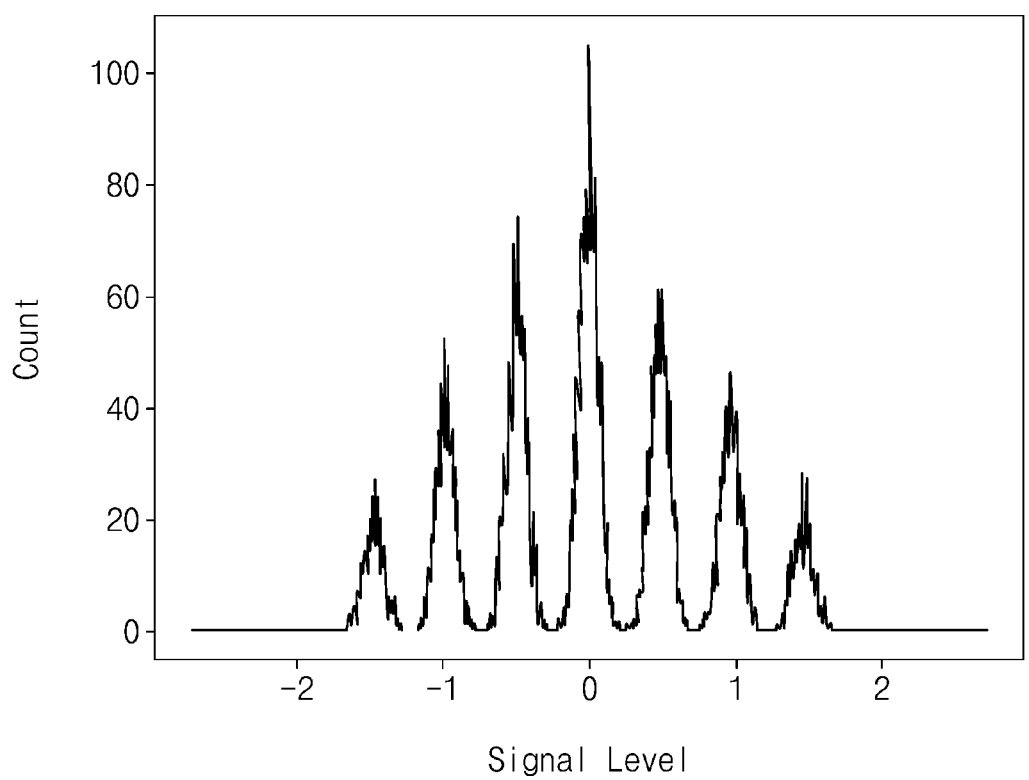
Figure 3C:
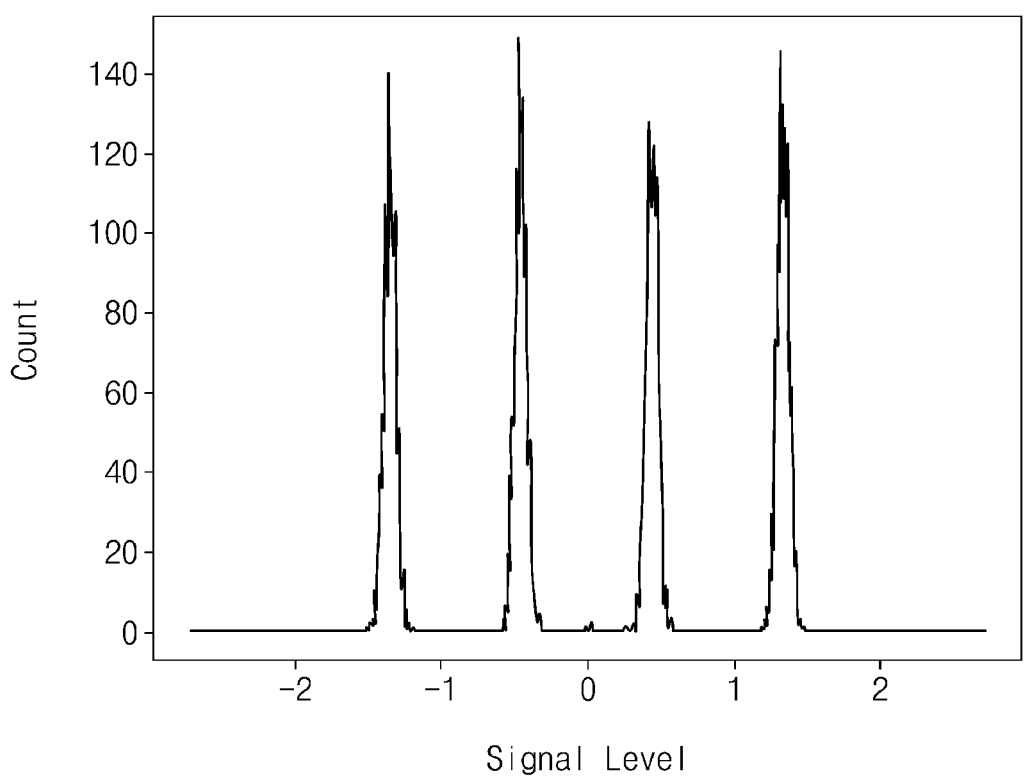

FIGS. 3A to 3C are diagrams for describing a method for estimating a timing skew, according to an embodiment of the present disclosure. FIG. 3A is an eye diagram of the receive signal rSIG of FIG. 1. In FIG. 3A, an x-axis represents a time, and an y-axis represents a level of the receive signal rSIG. FIG. 3B is a distribution diagram of sample data at a first time t1 of FIG. 3A. In FIG. 3B, an x-axis represents a level of the receive signal rSIG, and an y-axis represents the number (e.g., a count value) of sample data. FIG. 3C is a distribution diagram of sample data at a second time t2 of FIG. 3A. In FIG. 3C, an x-axis represents a level of the receive signal rSIG, and an y-axis represents the number (e.g., count value) of sample data.

Referring to FIGS. 1 and 3A, the receive signal rSIG may be a pulse amplitude modulation-4 (PAM-4) signal. The PAM-4 signal may include the receive signal rSIG of four levels (e.g., 1.5, 0.5, −0.5, and −1.5). The PAM-4 signal may form three eyes between four levels.

A maximum eye height of each eye may be a 1.0 level.

The first time t1 and the second time t2 may be sampling timings. The electronic circuit 100 may sample the receive signal rSIG at the first time t1 and the second time t2. For example, the first time t1 may be a time (e.g., 1UI) at which a first symbol of a data signal ends. An eye height may be minimum at the first time t1. The second time t2 may be a time (e.g., 1.5UI) at which the center of a second symbol of the data signal passes. An eye height may be maximum at the second time t2.

A statistical characteristic of first sample data sampled at the first time t1 may be different from a statistical characteristic of second sample data sampled at the second time t2. One statistical characteristic may include a normal distribution characteristic. For example, one statistical characteristic may include a probability distribution characteristic indicating a difference with the normal distribution. A difference between the statistical characteristic of the first sample data and the statistical characteristic of the second sample data may appear in a distribution difference of the first sample data and the second sample data.

Referring to FIGS. 3A and 3B, the first sample data may be counted depending on a level of the receive signal rSIG. A value of counting the first sample data (e.g., a count value) may be the most when a level of the receive signal rSIG is close to "0". Also, a value of counting the first sample data (e.g., a count value) may become smaller as a level of the receive signal rSIG becomes smaller than or greater than "0".

A distribution of the first sample data may be formed to be similar to the normal distribution when the receive signal rSIG has a 0 level. In the case of the PAM-4 signal, an eye may not be formed at the first time t1. As such, the first sample data may be distributed at a number of levels of the receive signal rSIG.

The statistical characteristic of the first sample data may indicate that a difference with the normal distribution is small. A statistical characteristic may be expressed by any value. The electronic circuit 100 may calculate any value indicating a statistical characteristic based on the first sample data.

Referring to FIGS. 3A and 3C, the second sample data may be counted depending on a level of the receive signal rSIG. A value of counting the second sample data (e.g., a count value) may be similar at four points (e.g., 1.5, 0.5, −0.5, and −1.5) listed at regular intervals depending on levels of the receive signal rSIG. In the case of the PAM-4 signal, three eyes may be formed at the second time t2. As such, the second sample data may be dispersively distributed at four signal levels forming three eyes.

A distribution of the second sample data may be formed to be different from the normal distribution. In this case, a statistical characteristic of the second sample data may indicate that a difference with the normal distribution is large. A statistical characteristic may be expressed by any value, and the electronic circuit 100 may calculate any value indicating a statistical characteristic based on the second sample data.

FIGS. 3A and 3C describe the case where the receive signal rSIG is a PAM-4 signal by way of example, but the disclosure is not limited thereto. For example, the receive signal rSIG may be a non-return to zero (NRZ) signal, a PAM-8 signal, a PAM-16 signal, etc.

The electronic circuit 100 may obtain a plurality of sample data at a plurality of sampling timings and may compare statistical characteristics of the sample data obtained at the sampling timings. Because the second sample data sampled at the second time t2 is less similar to the normal distribution than the first sample data sampled at the first time t1, the second time t2 may be a sampling timing more error-resistant (e.g., more accurate and less prone to error) than the first time t1. An error-resistant sampling timing may mean a sampling timing at which a timing skew does not occur or is small.

Accordingly, the electronic circuit 100 according to the present disclosure may search for an error-resistant sampling timing such as the second time t2 of FIG. 3A, while estimating a timing skew.

Figure 4:
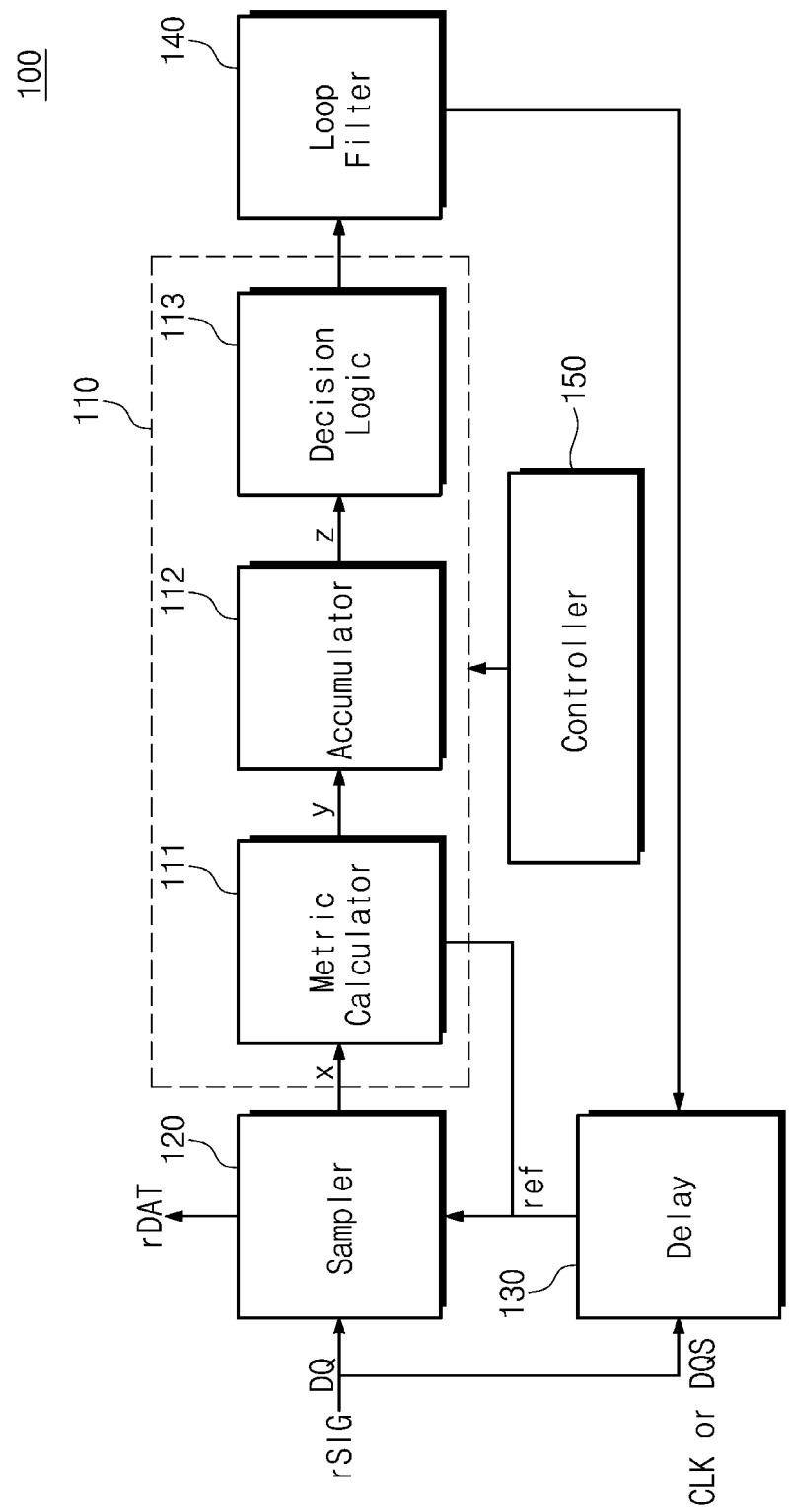
FIG. 4 is a block diagram of an electronic circuit according to an embodiment of the present disclosure.

FIG. 4 is a block diagram of an electronic circuit according to an embodiment of the present disclosure. Referring to FIG. 4, the electronic circuit 100 may include the timing skew estimation circuit 110, a sampler 120, a delay 130, a loop filter 140, and a controller 150.

The timing skew estimation circuit 110 may estimate a timing skew based on sample data "x" and a reference signal ref. The timing skew estimation circuit 110 may receive the sample data "x" from the sampler 120 (also described as a sampling circuit) and may receive the reference signal ref from the delay 130 (also described as a delay circuit). The sample data "x" may be data that are obtained by sampling the data signal DQ in synchronization with a rising edge and a falling edge of the reference signal ref. The sample data "x" may have an amplitude or level of the data signal DQ corresponding to the rising edge and the falling edge of the reference signal ref. The reference signal ref may be a signal that is obtained by delaying the data strobe signal DQS as much as a delay time set for each loop.

The timing skew estimation circuit 110 may include a metric calculator 111, an accumulator 112, and decision logic 113. The metric calculator 111, also described as a metric calculation circuit, may express a statistical characteristic of sample data by using a metric. The metric may reflect a probability distribution characteristic of the data signal DQ. For example, the metric may indicate an amount of difference between a probability distribution that the sample data "x" of the data signal DQ follows and the normal distribution.

For example, the metric may include Negentropy(J(X)).

$$I(X) = H(X_{gauss}) - H(X) \quad [\text{Equation 1}]$$

In Equation 1, "X" is a target probability variable, and $X_{gauss}$ is a normal distribution probability variable of "X". H(X) means an entropy of "X". That is, Negentropy(J(X)) may be a metric indicating a difference between a probability distribution of the sample data "x" and the normal distribution through the entropy.

However, because a probability density function is generally required to calculate the entropy, direct calculation may be difficult. For simple calculation, the metric may include an approximation function or a tendency function for Negentropy(J(X)).

$$I(X) \approx \tfrac{1}{12}(E(X^3))^2 + \tfrac{1}{48}(\text{kurt}(X))^2 \quad [\text{Equation 2}]$$

Negentropy(J(X)) may be summarized to be similar to Equation 2. In Equation 2, "X" is a target probability variable, E(x) is an average of "X" as an expectation value for "X", and kurt(X) is a kurtosis value for "X". An approximation function of Negentropy(J(X)) may be summarized to Equation 3 or Equation 4.

$$J_a(X) = k_1(E(X^* \exp(-X^2/2))^2 + k_2{}^a(E(|x|) - \sqrt{2/\pi})^2 \quad [\text{Equation 3}]$$

$$J_b(X) = k_1(E(X^* \exp(-X^2/2))^2 + k_2{}^b(E(\exp(-X^2/2)) - \sqrt{1/2})^2 \quad [\text{Equation 4}]$$

In Equation 3 and Equation 4, "X" is a target probability variable, E(X) is an expectation value for "X", $k_1$ and $k_2$ and are specific constant values. The timing skew estimation circuit 110 may directly calculate an approximation function $J_a(X)$ or $J_b(X)$ through the metric calculator 111 and may estimate a timing skew in the direction of maximizing or minimizing a metric.

According to an embodiment, the metric calculator 111 may calculate a tendency function f(x). The tendency function f(x) may be a function in which a cumulative value of the tendency function f(x) shows the tendency of Negentropy(J(X)). The tendency function f(x) may be adopted instead of Negentropy(J(X)) for the purpose of an efficient operation of the metric calculator 111.

$$f(x) = \begin{cases} 1, & \beta < x < \alpha \\ 0, & \text{otherwise} \end{cases} \quad [\text{Equation 5}]$$

In Equation 5, "x" is a signal level of sample data, and α and β are setting levels. Here, (α−β) may be a specific level set to be greater than an eye height. For example, in the PAM-4 signal, in the case where each eye height is 2delta, (α−β) may be set to 3delta. In detail, in the PAM-4 signal, when levels of respective eyes are −1.5, −0.5, 0.5, and 1.5, a level of an eye height may be 1.0, and (α−β) may be 1.5. According to an embodiment, absolute values of α and β may be the same. In this case, α=−β, α may be 0.75, and β may be −0.75.

The tendency function f(x) outputs "1" when a signal level of the sample data "x" is between α and β and outputs "0" when the signal level of the sample data "x" is equal to or greater than α or is equal to or smaller than β. As the number of 1s' output from the tendency function f(x) increases, a cumulative value of the tendency function f(x)

may become greater. That the cumulative value is great may mean that levels of signals sampled at a specific timing are relatively more included within a specific range. This may mean that the levels of the signals sampled at the specific timing are distributed to be close to the normal distribution. As a result, as a cumulative value of the tendency function f(x) becomes greater, a distribution of the sample data "x" may become closer to the normal distribution. On the other hand, as a cumulative value of the tendency function f(x) becomes smaller, a difference between a distribution of the sample data "x" and the normal distribution may become greater.

The tendency function f(x) is not limited to Equation 5. For example, the tendency function f(x) may be $f(x)=|x|^\alpha$ or $f(x)=x^4$. Below, for convenience of description, the tendency function f(x) will be described based on Equation 5.

The metric calculator 111 may provide a metric value "y" of calculating the tendency function f(x) to the accumulator 112. The accumulator 112, or accumulation circuit, may accumulate the metric value "y" to output a cumulative value. According to an embodiment, the accumulator 112 may normalize and output the cumulative value. Below, an output value "z" of the accumulator 112 may be a value of normalizing the cumulative value.

The accumulator 112 may provide the output value "z" to the decision logic 113, also described as a decision logic circuit. The accumulator 112 may obtain a cumulative value through a digital logic operation. Alternatively, the accumulator 112 may be implemented based on an analog circuit such as a charge pump circuit.

The decision logic 113 may estimate a timing skew based on the output value "z". The output value "z" may be generated in each of a plurality of loops. The number of loops may be set in advance, and a sampling timing may change for each loop. For example, the number of loops may be "5" in the case of setting sampling timings such that a timing delay of 0.2UI occurs for each loop. In this case, 5 output values may be generated.

The decision logic 113 may estimate a timing skew in the last loop of the plurality of loops set in advance. Whether a current loop is the last loop may be determined by the controller 150. When the current loop is not the last loop, the decision logic 113 may output a delay signal directing the execution of a next loop. When the current loop is the last loop, the decision logic 113 may decide a maximum value or a minimum value of a plurality of output values.

Various algorithms such as a hill climbing algorithm and a binary search algorithm may be used to decide a maximum value or a minimum value.

The output value "z" that is a value corresponding to Negentropy(J(X)) may indicate a difference between a probability distribution of the sample data "x" and the normal distribution. That is, the maximum value or the minimum value of the plurality of output values may mean that a difference with the normal distribution is the largest. The maximum value or the minimum value may change depending on a kind of the tendency function f(x); in the case of the tendency function f(x) in Equation 5, a difference with the normal distribution may be the largest at the minimum value.

The decision logic 113 may determine a loop, in which the maximum value or the minimum value is output, as a decision loop. A sampling timing set in the decision loop may be an optimum sampling timing of a plurality of sampling timings set in a plurality of loops. The decision logic 113 may estimate a timing delay, which is applied to set the sampling timing in the decision loop, as a timing skew.

The decision logic 113 may output a compensation signal for delaying the data strobe signal DQS as much as a time corresponding to the estimated timing skew. The compensation signal may be provided to the delay 130 through the loop filter 140.

According to an embodiment, the decision logic 113 may include at least one of a central processing unit (CPU), an image signal processing unit (ISP), a digital signal processing unit (DSP), a graphics processing unit (GPU), a vision processing unit (VPU), and a neural processing unit (NPU).

The sampler 120 may receive the data signal DQ from a receiver. The data signal DQ may have a waveform corresponding to a waveform of transmission data of a transmitter. The sampler 120 may sample the data signal DQ based on the reference signal ref. The reference signal ref may be a signal that is obtained by delaying the data strobe signal DQS as much as a timing delay set for each loop.

The sampler 120 may sample the data signal DQ at a timing corresponding to at least one of a rising edge or a falling edge of the reference signal ref. The reference signal ref may provide a sampling timing to the sampler 120. The sampler 120 may sample the data signal DQ at each of the plurality of loops and may provide sample data to the timing skew estimation circuit 110.

The sampler 120 may provide sample data to the timing skew estimation circuit 110 until the plurality of loops end. After the plurality of loops end, the sampler 120 may transmit final sample data, which are sampled based on a final reference signal, to the outside of the electronic circuit 100. The final sample data may be sample data where the compensation for the estimated timing skew is made.

The delay 130 may receive the data strobe signal DQS from a receiver. The delay 130 may delay the data strobe signal DQS as much as a delay time set for each loop so as to be output as the reference signal ref. The reference signal ref may be provided to the sampler 120 and may be used as a criterion of a sampling timing.

The delay 130 may delay the data strobe signal DQS as much as the delay time set for each loop, in response to the delay signal generated by the decision logic 113. The delay 130 may output a final reference signal in response to the compensation signal generated by the decision logic 113. The final reference signal may be a signal that is obtained by delaying the data strobe signal DQS as much as a time corresponding to the estimated timing skew.

The loop filter 140 may filter specific frequency components of the delay signal or the compensation signal generated by the decision logic 113. For example, the loop filter 140 may cut off frequency components that are inappropriate to delay the data strobe signal DQS. As such, the delay 130 may generate a clean reference signal or a final reference signal.

The controller 150 may control an operation of the electronic circuit 100. For example, the controller 150 may control an operation of the timing skew estimation circuit 110. The controller 150 may allow the metric calculator 111 to calculate a metric based on the tendency function f(x). The controller 150 may determine whether a current loop is the last loop of the plurality of loops, to allow the decision logic 113 to output the compensation signal.

For example, the controller 150 may control an operation of the delay 130. The controller 150 may deactivate the delay 130 in a first loop. When deactivated, the delay 130 may output the data strobe signal DQS as the reference signal ref without a timing delay. The controller 150 may control the degree of timing delay of the delay 130 in response to the delay signal or the compensation signal.

For example, the controller 150 may control an operation of the sampler 120. The controller 150 may allow the sampler 120 to output sample data to the timing skew estimation circuit 110 in response to the reference signal ref. The controller 150 may allow the sampler 120 to output sample data to the outside of the electronic circuit 100 in response to the final reference signal.

According to an embodiment, the controller 150 may include at least one of a central processing unit (CPU), an image signal processing unit (ISP), a digital signal processing unit (DSP), a graphics processing unit (GPU), a vision processing unit (VPU), and a neural processing unit (NPU).

Figure 5:
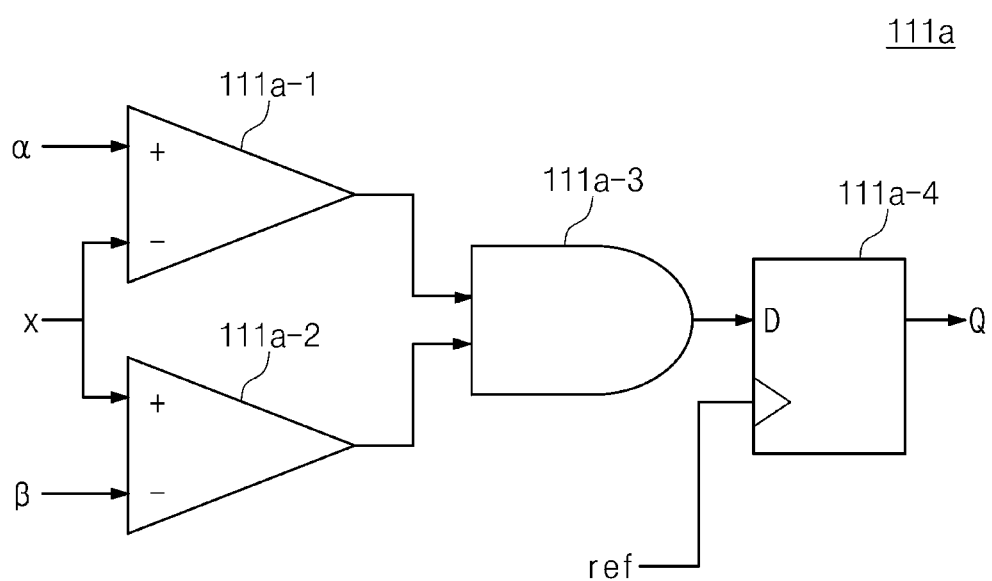
FIG. 5 is a logic diagram illustrating an embodiment of a metric calculator of FIG. 4 in detail.

FIG. 5 is a logic diagram illustrating an embodiment of a metric calculator of FIG. 4 in detail. Referring to FIGS. 4 and 5, a metric calculator 111a may include a first comparator 111a-1, a second comparator 111a-2, an AND operator 111a-3, and a flip-flop 111a-4. The metric calculator 111a may be an embodiment for calculating the metric of Equation 5.

The first comparator 111a-1 may compare a signal level of the sample data "x" and a first setting level $\alpha$. The first comparator 111a-1 may output bit 1 when the signal level of the sample data "x" is smaller than the first setting level $\alpha$. The first comparator 111a-1 may output bit 0 when the signal level of the sample data "x" is equal to or greater than the first setting level $\alpha$. For example, in the PAM-4 signal, in the case where each eye height is 2delta, the first setting level $\alpha$ may be set to 3delta.

The second comparator 111a-2 may compare the signal level of the sample data "x" and a second setting level $\beta$. The second comparator 111a-2 may output bit 1 when the signal level of the sample data "x" is greater than the second setting level $\beta$. The second comparator 111a-2 may output bit 0 when the signal level of the sample data "x" is equal to or smaller than the second setting level $\beta$. For example, the second setting level $\beta$ may be a negative value of the first setting level $\alpha$ (i.e., $\beta=-\alpha$).

The AND operator 111a-3 may perform an AND operation on outputs of the first comparator 111a-1 and the second comparator 111a-2. The AND operator 111a-3 may output bit 1 when all the outputs of the first comparator 111a-1 and the second comparator 111a-2 are bit 1. The AND operator 111a-3 may output bit 0 when at least one of the outputs of the first comparator 111a-1 and the second comparator 111a-2 is bit 0.

The flip-flop 111a-4 may store 1-bit data. The flip-flop 111a-4 may process digital data based on the reference signal ref. For example, the flip-flop 111a-4 may apply an input "D" to an output "Q" at a rising edge of the reference signal ref. The input "D" may be an output value of the AND operator 111a-3, and the output "Q" may be the metric value "y" for the tendency function f(x). The metric value "y" may be synchronized with the rising edge of the reference signal ref.

Figure 6:
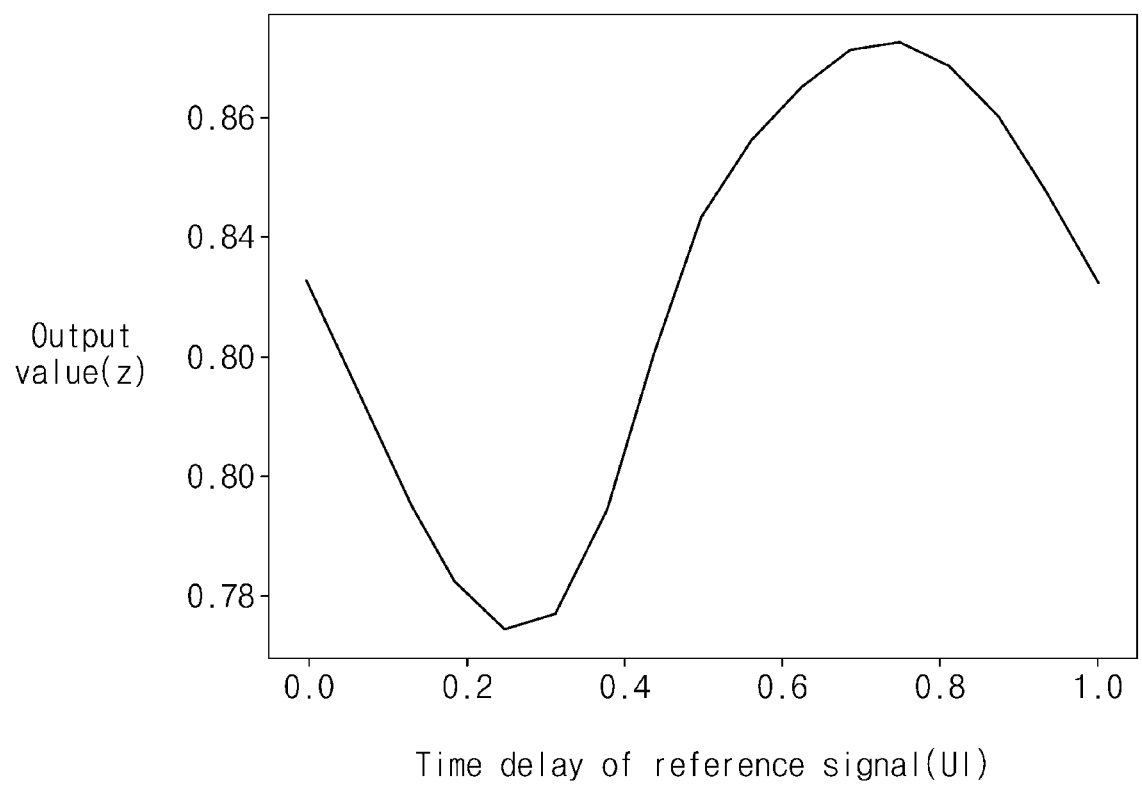
FIG. 6 is a graph illustrating an output value of an accumulator of FIG. 4.

FIG. 6 is a graph illustrating an output value of an accumulator, or metric calculator, of FIG. 4. In FIG. 6, an x-axis represents a timing delay of the reference signal ref, and an y-axis represents the output value "z". Referring to FIGS. 4 to 6, the accumulator 112 may calculate a cumulative value by accumulating the metric value "y" and may normalize the cumulative value to a sample count so as to be output as the output value "z".

The output value "z" may vary with a timing delay of the reference signal ref. The timing delay of the reference signal ref may correspond to a timing delay of a sampling timing. The reference signal ref that is a signal obtained by delaying the data strobe signal DQS may provide a sampling timing. That is, a sampling timing may vary with a timing delay of the reference signal ref.

The timing delay of the reference signal ref may increase uniformly every loop. The output value "z" may be generated every loop, and a plurality of output values may be generated through a plurality of loops. The decision logic 113 may decide a maximum value or a minimum value of the plurality of output values generated in the plurality of loops.

FIG. 6 shows an example of the output value "z" through the metric calculator 111a of FIG. 5. The decision logic 113 may decide the output value "z" as minimum when the timing delay of the reference signal ref is 0.25UI. For example, the decision logic 113 may decide a loop in which the minimum value of the plurality of output values is output as a decision loop, and may estimate 0.25UI being a timing delay for the reference signal ref in the decision loop, as a timing skew.

In this case, a final reference signal may be a signal that is obtained by delaying the data strobe signal DQS as much as 0.25UI, and an optimum sampling timing may be a timing corresponding to a rising edge or a falling edge of the final reference signal. The delay 130 may provide the final reference signal to the sampler 120, and the sampler 120 may sample the data signal DQ at the optimum sampling timing so as to be output as the reception data rDAT.

Figure 7:
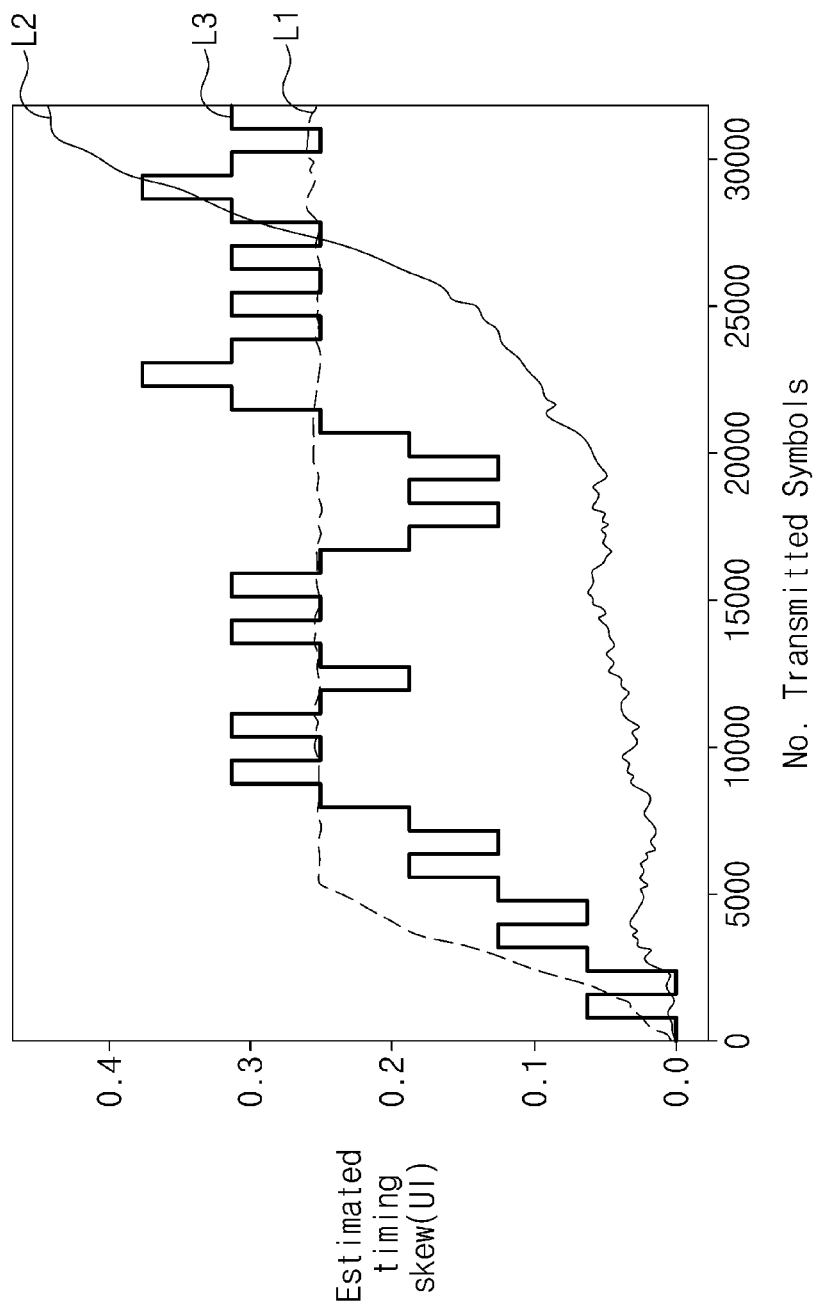
FIG. 7 is a graph illustrating performance of a timing skew estimation circuit of FIG. 4.

FIG. 7 is a graph illustrating performance of a timing skew estimation circuit of FIG. 4. In FIG. 7, an x-axis represents the number of transmitted symbols, and a y-axis represents an estimated timing skew. Referring to FIGS. 4 to 7, the timing skew estimation circuit 110 may estimate a timing skew by using a statistical distribution characteristic of the sample data "x".

The timing skew estimation circuit 110 may estimate a timing skew by using a metric associated with a probability distribution of sample data during a normal write operation, without a separate training operation. In this case, a data comparing operation using an equalizer, such as a decision feedback equalizer (DFE), in a training operation may be omitted.

The training operation may include an operation of measuring a timing delay value of a data signal relative to a data strobe signal through training data before performing a write operation. In this case, the equalizer may operate based on a Mueller-Muller algorithm ($\Sigma A_{k-1}x_k - A_k x_{k-1}$). Also, a normal operation of the equalizer may be presumed in the process of comparing a (k−1)-th slicer output $A_{k-1}$ and a k-th slicer output $A_k$. The equalizer such as a decision feedback equalizer (DFE) may be essential in the training operation.

For example, a first curve L1 of FIG. 7 indicates timing skew estimation performance of a clock and data recovery circuit (CDR) using the decision feedback equalizer (DFE). In this case, a timing skew may be estimated as close to 0.25UI. However, like a second curve L2, the clock and data recovery circuit (CDR) that does not use an equalizer may fail to properly estimate a timing skew.

On the other hand, a third curve L3 indicates estimation performance of the timing skew estimation circuit 110. The third curve L3 shows an estimation result of a timing skew at about 0.25UI like the first curve L1. According to the embodiment depicted in the third curve L3, the timing skew estimation circuit 110 may estimate a timing skew by using only a statistical distribution characteristic of the sample data "x" without using a separate equalizer and may set an appropriate sampling timing.

Figure 8:
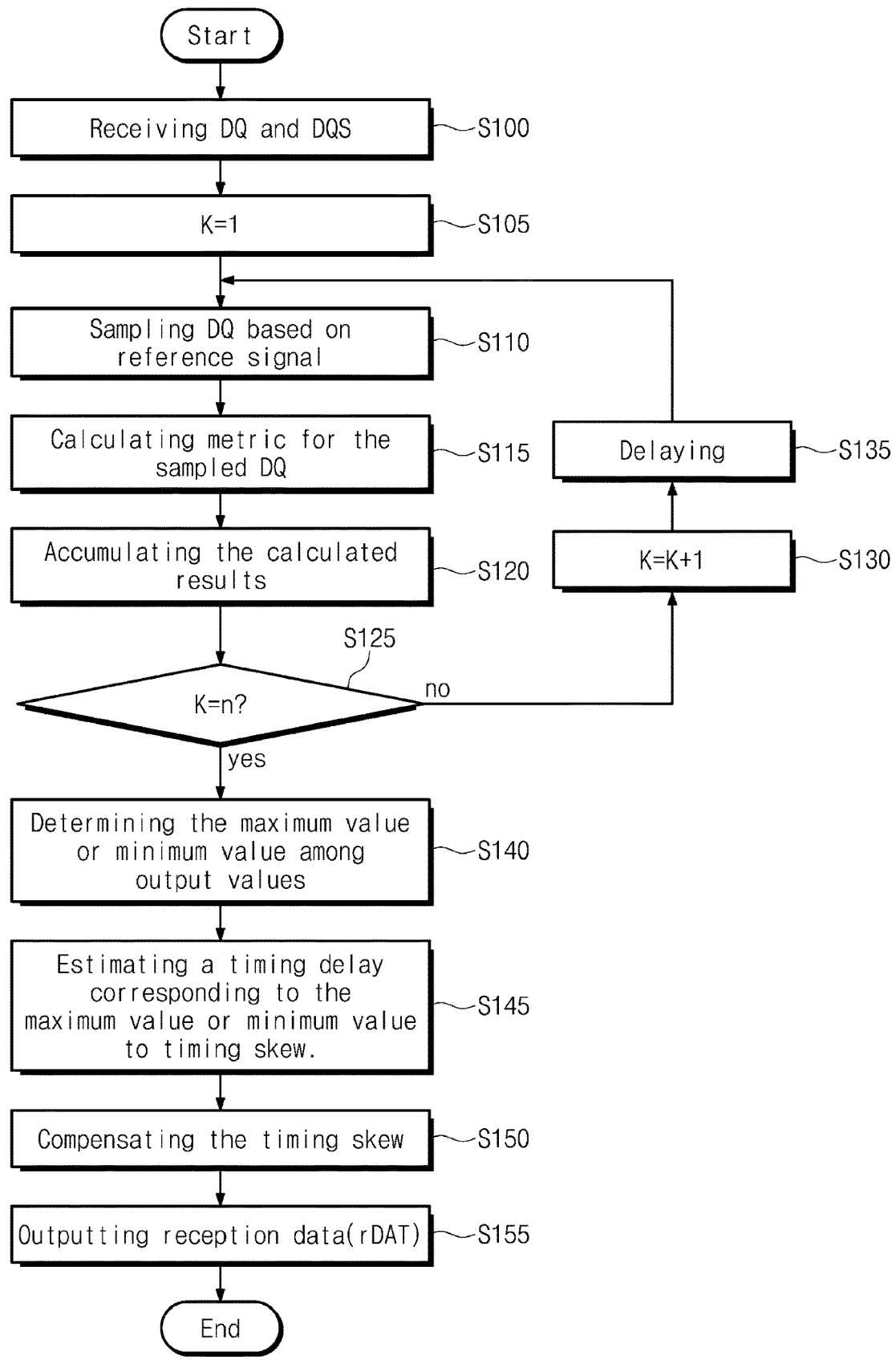
FIG. 8 is a flowchart illustrating an operation method of an electronic device of FIG. 4.

FIG. 8 is a flowchart illustrating an operation method of an electronic device of FIG. 4. Referring to FIGS. 4 and 8, the electronic circuit 100 may convert the receive signal rSIG into reception data rDAT and may output the reception data rDAT.

In operation S100, the electronic circuit 100 receives the data signal DQ and the data strobe signal DQS. The electronic circuit 100 samples the data signal DQ while sequentially executing a plurality of loops set in advance. In operation S105, the electronic circuit 100 may determine a current loop as a first loop (i.e., K=1).

In operation S110, the electronic circuit 100 samples the data signal DQ based on the reference signal ref. For example, the electronic circuit 100 may sample the data signal DQ at timings each corresponding to a rising edge of a data strobe signal. In this case, the reference signal ref may be the data strobe signal DQS.

In operation S115, the electronic circuit 100 calculates a metric value of the data signal DQ sampled based on the data strobe signal DQS. The metric value may be a value indicating a statistical characteristic of sample data. For example, the metric value may indicate a difference with respect to the normal distribution. For example, the metric value may be an output value of the tendency function f(x) showing the tendency of Negentropy(J(X)).

In operation S120, the electronic circuit 100 accumulates the calculated metric value. According to an embodiment, the electronic circuit 100 may normalize the cumulative value to a sample count. The electronic circuit 100 may store an output value obtained by normalizing the cumulative value.

In operation S125, the electronic circuit 100 determines whether a current loop is the last loop of the plurality of loops set in advance. When the current loop is not the last loop, in operation S130, the electronic circuit 100 performs a next loop (i.e., K=K+1). In operation S135, the electronic circuit 100 may delay the data strobe signal DQS as much as a set time. In this case, the reference signal ref for the next loop may be the delayed data strobe signal DQS. The electronic circuit 100 may again sample the data signal DQ based on the reference signal ref and may perform operation S110 to operation S125.

When it is determined in operation S125 that the current loop is the last loop, the electronic circuit 100 performs operation S140. In operation S140, the electronic circuit 100 determines a maximum value or a minimum value of a plurality of output values. For example, the maximum value or the minimum value that is a metric value indicating the largest difference from the normal distribution may correspond to a timing having a maximum eye height of an eye opening.

In operation S145, the electronic circuit 100 estimates a timing delay, which is set to the data strobe signal DQS in a loop where the maximum value or the minimum value of the plurality of output values is determined, as a timing skew. For example, the electronic circuit 100 may determine that a distribution of sample data has the largest difference from the normal distribution when sampling is performed based on a reference signal that is obtained by delaying the data strobe signal DQS as much as a set timing delay.

In operation S150, the electronic circuit 100 makes compensation for the estimated timing skew. For example, the electronic circuit 100 may delay the data strobe signal DQS as much as a timing corresponding to the estimated timing skew. For example, the electronic circuit 100 may delay the data signal DQ as much as the timing corresponding to the estimated timing skew.

In operation S155, the electronic circuit 100 outputs the reception data rDAT. The reception data rDAT may be data signal DQ that is sampled based on a final reference signal that is free from a timing skew. The reception data rDAT may include information that a transmitter intends to provide.

Figure 9:
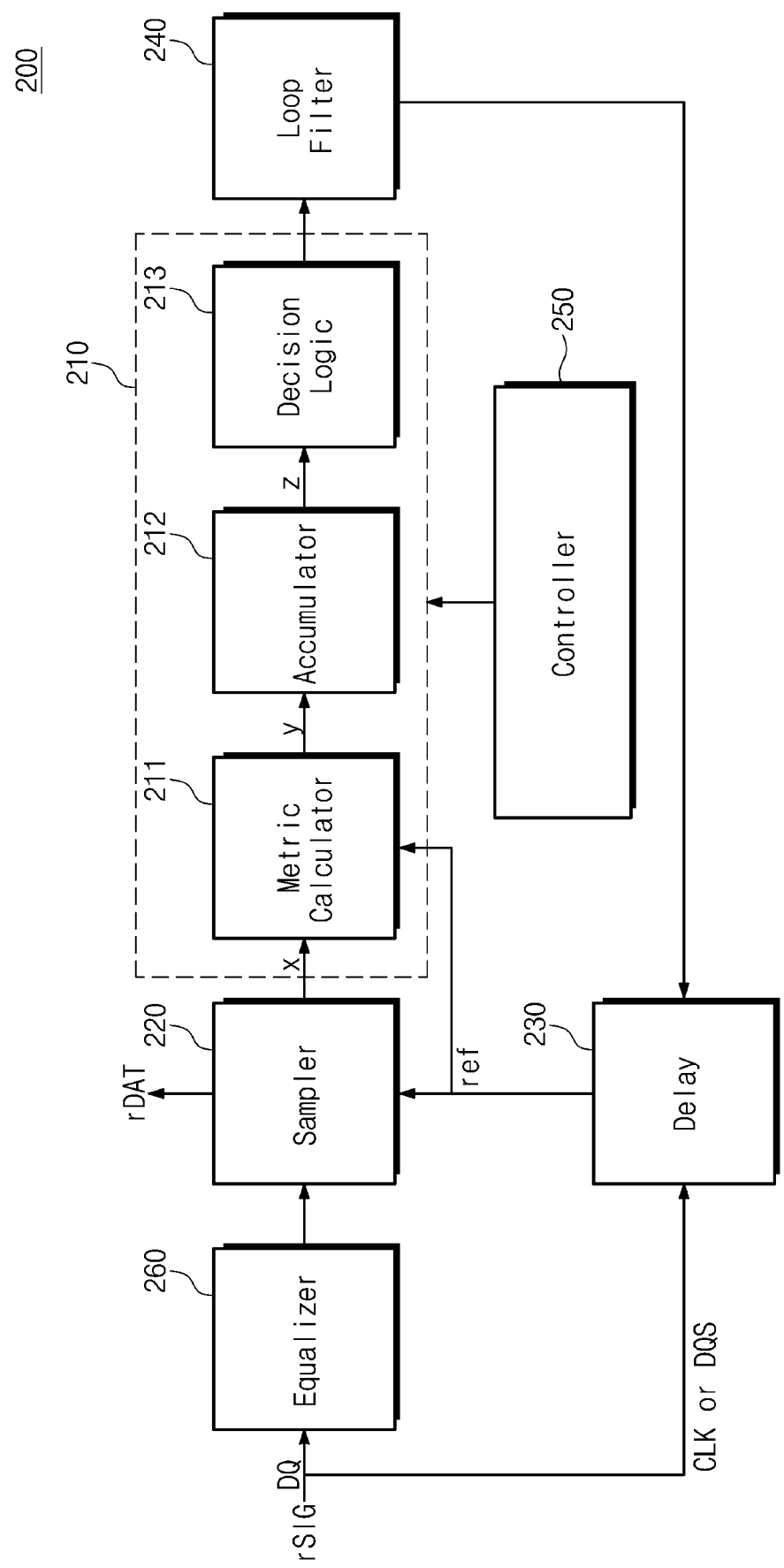
FIG. 9 is a block diagram of an electronic circuit according to an embodiment of the present disclosure.

FIG. 9 is a block diagram of an electronic circuit according to an embodiment of the present disclosure. Referring to FIGS. 4 and 9, an electronic circuit 200 may include a timing skew estimation circuit 210, a sampler 220, a delay 230, a loop filter 240, a controller 250, and an equalizer 260. The timing skew estimation circuit 210 may include a metric calculator 211, an accumulator 212, and decision logic 213.

The metric calculator 211, the accumulator 212, the decision logic 213, the sampler 220, the delay 230, the loop filter 240, and the controller 250 are similar to the metric calculator 111, the accumulator 112, the decision logic 113, the sampler 120, the delay 130, the loop filter 140, and the controller 150 of FIG. 4, and thus, additional description will be omitted to avoid redundancy.

The equalizer 260 may receive the data signal DQ from a receiver and may adjust the data signal DQ. The equalizer 260 may recover a distorted signal on a channel or a high speed serial link. For example, the equalizer 260 may compensate for frequency attenuation on a data signal received through an input terminal of the receiver and may provide a recovered data signal to the sampler 220. The recovered data signal may have the intensity suitable for processing in the electronic circuit 200.

The sampler 220 may sample the recovered data signal based on the reference signal ref. As illustrated in FIG. 9, in the case of sampling a signal in which a frequency attenuated on a channel is recovered before sampling, the data signal DQ may be sampled more accurately, and thus, the electronic circuit 200 makes estimation accuracy of a timing skew high.

Figure 10:
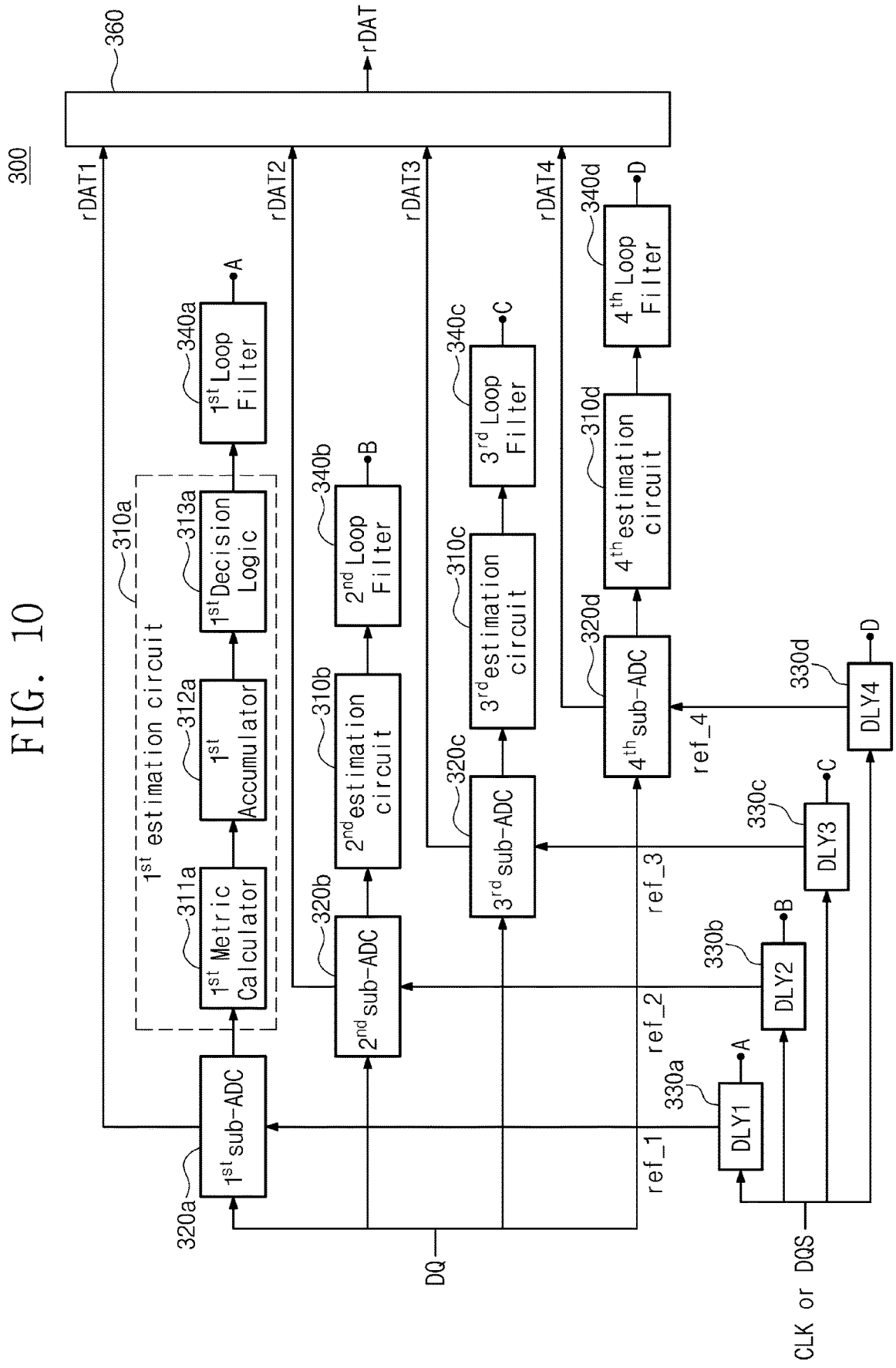
FIG. 10 is a block diagram of an electronic circuit according to an embodiment of the present disclosure.

FIG. 10 is a block diagram of an electronic circuit according to an embodiment of the present disclosure. Referring to FIGS. 4 and 10, an electronic device 300 may be applied to a time interleaved analog to digital converter (TI-ADC).

The electronic device 300 may include first to fourth sub-ADCs 320a, 320b, 320c, and 320d, first to fourth estimation circuits 310a, 310b, 310c, and 310d, first to fourth delays 330a, 330b, 330c, and 330d, first to fourth loop filters 340a, 340b, 340c, and 340d, and a buffer 360.

The first to fourth sub-ADCs 320a, 320b, 320c, and 320d may convert the data signal DQ into first to fourth reception data rDAT1, rDAT2, rDAT3, and rDAT4 in response to first to fourth reference signals ref_1, ref_2, ref_3, and ref_4, respectively. The first to fourth reference signals ref_1, ref_2, ref_3, and ref_4 may be signals that are obtained by delaying the data strobe signal DQS at different timings. For example, edges of the first to fourth reference signals ref_1, ref_2, ref_3, and ref_4 may be time-interleaved.

In the case where there is a need for high performance of communication, it may be necessary to adopt a clock signal or a data strobe signal of a high frequency. However, it may be physically difficult to implement a clock signal or a data strobe signal of a frequency higher than a specific frequency. Accordingly, the plurality of reference signals ref_1, ref_2, ref_3, and ref_4 time-interleaved may be adopted. Even though each of the plurality of reference signals ref_1, ref_2, ref_3, and ref_4 has a low frequency, the plurality of reference signals ref_1, ref_2, ref_3, and ref_4 may provide timings sufficient to sample the data signal DQ.

The first sub-ADC 320a may receive the data signal DQ and may perform sampling based on the first reference signal ref_1. The first sub-ADC 320a may include a first sampler similar to the sampler 120 of FIG. 4, and thus, additional description will be omitted to avoid redundancy. The first sub-ADC 320a may provide sampled sample data to the first estimation circuit 310a.

The first estimation circuit 310a may include a first metric calculator 311a, a first accumulator 312a, and first decision logic 313a. Although not illustrated in FIG. 10, the first estimation circuit 310a may further include a controller that controls the first estimation circuit 310a to extract a statistical characteristic of sample data until a plurality of loops end and controls the first estimation circuit 310a to output a compensation signal when the plurality of loops end. According to an embodiment, the controller may be configured to control an operation of each component of the electronic device 300.

When the plurality of loops end, the first estimation circuit 310a may provide the compensation signal to the first delay 330a through the first loop filter 340a. The first metric calculator 311a, the first accumulator 312a, the first decision logic 313a, the delay 330a, and the first loop filter 340a are similar to the metric calculator 111, the accumulator 112, the decision logic 113, the delay 130, and the loop filter 140 of FIG. 4, and thus, additional description will be omitted to avoid redundancy.

The second to fourth sub-ADCs 320b, 320c, and 320d, the second to fourth estimation circuits 310b, 310c, and 310d, the second to fourth delays 330b, 330c, and 330d, and the second to fourth loop filters 340b, 340c, and 340d are similar to the first sub-ADC 320a, the first estimation circuit 310a, the first delay 330a, and the first loop filter 340a except that time-interleaving is made at different timings, and thus, additional description will be omitted to avoid redundancy. For example, the first to fourth sub-ADCs 320a, 320b, 320c, and 320d may convert the data signal DQ into the first to fourth reception data rDAT1, rDAT2, rDAT3, and rDAT4 at the time-interleaved sampling timings, respectively.

The buffer 360 receives the first to fourth reception data rDAT1, rDAT2, rDAT3, and rDAT4. The buffer 360 may store the first to fourth reception data rDAT1, rDAT2, rDAT3, and rDAT4 and outputs the reception data rDAT based on the first to fourth reception data rDAT1, rDAT2, rDAT3, and rDAT4. For example, the reception data rDAT may be a signal obtained by merging the first to fourth reception data rDAT1, rDAT2, rDAT3, and rDAT4.

Figure 11:
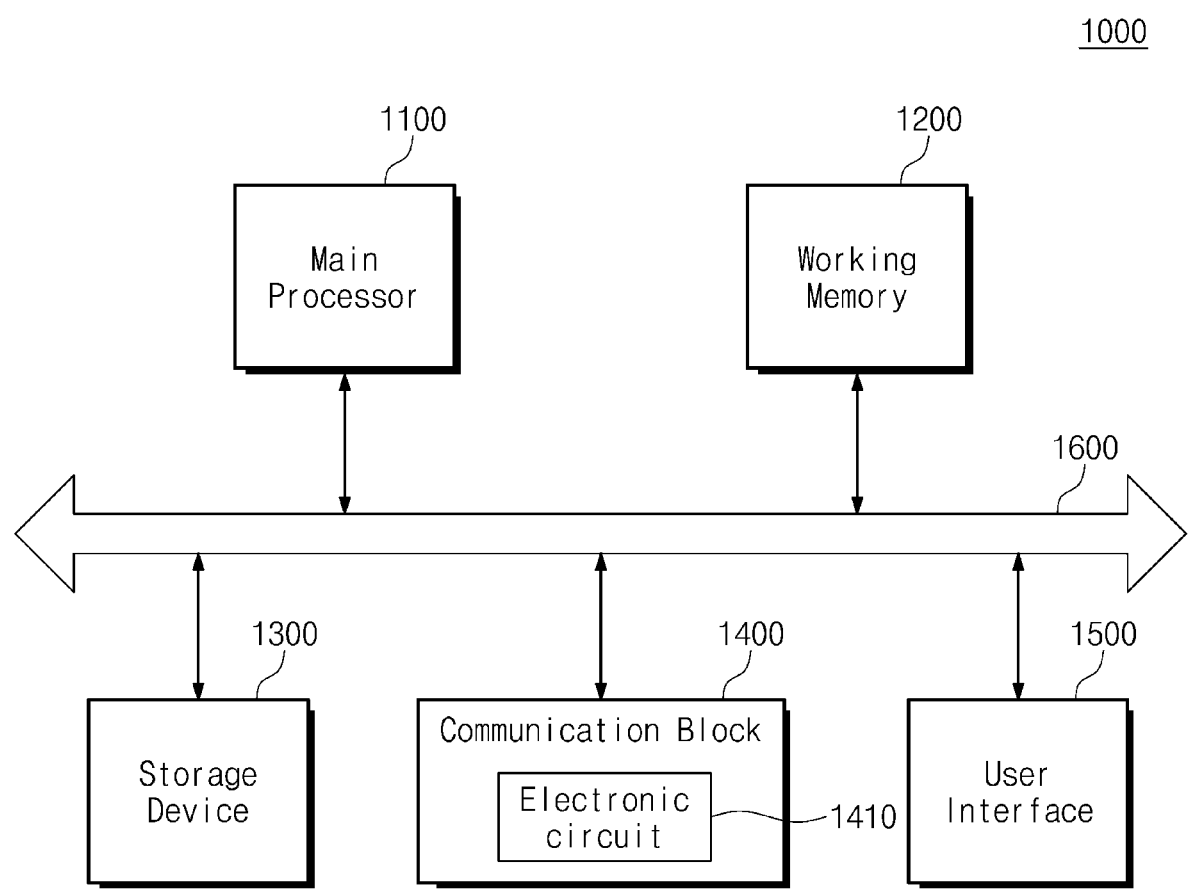
FIG. 11 is a block diagram of an electronic system to which an electronic circuit according to an embodiment of the present disclosure is applied.

FIG. 11 is a block diagram of an electronic system to which an electronic circuit according to an embodiment of the present disclosure is applied. Referring to FIG. 11, an electronic system 1000 may include a main processor 1100, a working memory 1200, a storage device 1300, a communication block 1400, a user interface 1500, and a bus 1600. The electronic system 1000 may be one of a desktop computer, a laptop computer, a tablet computer, a smartphone, a wearable device, an electric vehicle, and a workstation. The electronic system 1000 may be an electronic device used by an end-user, or may be a component of a large-scale system such as a server system or a data center.

The main processor 1100 may control overall operations of the electronic system 1000. The main processor 1100 may process various kinds of arithmetic operations and/or logical operations. For example, the main processor 1100 may be implemented with a general-purpose processor, a special-purpose processor, or an application processor.

The working memory 1200 may store data to be used for an operation of the electronic system 1000. The working memory 1200 may temporarily store data processed or to be processed by the main processor 1100. For example, the working memory 1200 may include a volatile memory, such as a dynamic random access memory (DRAM) or a synchronous DRAM (SDRAM), and/or a nonvolatile memory, such as a phase-change RAM (PRAM), a magneto-resistive RAM (MRAM), a resistive RAM (ReRAM), or a ferroelectric RAM (FRAM).

A memory device of the storage device 1300 may store data regardless of whether a power is supplied. For example, the storage device 1300 may include a nonvolatile memory such as a flash memory, a PRAM, an MRAM, an ReRAM, an FRAM, etc. For example, the storage device 1300 may include a storage medium such as a hard disk drive (HDD), a solid state drive (SSD), card storage, or embedded storage.

The communication block 1400 may communicate with an external device/system of the electronic system 1000. The communication block 1400 may be a component capable of providing a communication service, such as a modulator/demodulator (MODEM) chip or device, a network card, a communication switch, a hub, or a router. For example, the communication block 1400 may support at least one of various wireless communication protocols such as LTE, WIMAX, GSM, CDMA, Bluetooth, near field communication (NFC), Wi-Fi, and RFID and/or at least one of various wired communication protocols such as TCP/IP, USB, and Firewire.

The communication block 1400 may include various electronic circuits, such as a transmitter circuit, a receiver circuit, and an electronic circuit 1410, for the purpose of providing a communication service. The electronic circuit 1410 may perform an operation of estimating and compensating for a timing skew, according to embodiments of the present disclosure. Accordingly, an error of sampling timings may be reduced or eliminated, and the stability of data recovery may be improved by an accurate sampling timing.

The user interface 1500 may perform communication arbitration between a user and the electronic system 1000. For example, the user interface 1500 may include input interfaces such as a keyboard, a mouse, a keypad, a button, a touch panel, a touch screen, a touch pad, a touch ball, a camera, a microphone, a gyroscope sensor, and a vibration sensor. For example, the user interface 1500 may include output interfaces such as a liquid crystal display (LCD) device, a light emitting diode (LED) display device, an organic LED (OLED) display device, an active matrix OLED (AMOLED) display device, a speaker, and a motor.

The bus 1600 may provide a communication path between the components of the electronic system 1000. The components of the electronic system 1000 may exchange data with each other based on a bus format of the bus 1600. For example, the bus format may include one or more of various interface protocols such as USB, small computer system interface (SCSI), peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), enhanced IDE (EIDE), nonvolatile memory express (NVMe), and universal flash storage (UFS).

According to the present disclosure, an electronic circuit may reduce the degradation of performance of an electronic device due to a training operation by estimating a timing skew by using a statistical characteristic of signals sampled in a normal operation. Also, an electronic device including the electronic circuit according to the present disclosure may estimate an accurate sampling timing through a simple metric without an equalizer, thus making the electronic device small-sized and an operating speed high.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic circuit which converts a receive signal being analog into reception data being digital, the electronic circuit comprising:
   a delay circuit configured to receive a first receive signal and to output a reference signal, the reference signal being generated by delaying the first receive signal as much as one of a plurality of different timing delays respectively set to a plurality of loops;
   a sampler configured to receive a second receive signal and to sample the second receive signal based on the reference signal in each of the plurality of loops;
   a timing skew estimation circuit configured to output a compensation signal for compensating for a timing skew by determining a metric value indicating a statistical characteristic of a plurality of sample data sampled through the sampler and estimating the timing skew based on the determined metric value; and
   a controller configured to control an operation of the timing skew estimation circuit,
   wherein the timing skew estimation circuit includes:
   a metric calculator configured to calculate the metric value indicating the statistical characteristic of the plurality of the sample data;
   an accumulator configured to accumulate the metric value; and
   decision logic configured to estimate the timing skew based on an output value of the accumulator.

2. The electronic circuit of claim 1, wherein the first receive signal includes a data strobe signal or a clock signal synchronized with the second receive signal, and
   wherein the second receive signal includes a data signal having a waveform corresponding to a waveform of transmission data transmitted by an external device.

3. The electronic circuit of claim 1, wherein the sampler is configured to:
   receive the reference signal from the delay circuit; and
   output the plurality of sample data by sampling the second receive signal at respective timings corresponding to at least one of a rising edge or a falling edge of the reference signal.

4. The electronic circuit of claim 1, wherein the controller is configured to:
   control the timing skew estimation circuit to extract the statistical characteristic until the plurality of loops end; and
   control the timing skew estimation circuit to output the compensation signal when the plurality of loops end.

5. The electronic circuit of claim 1, further comprising:
   an equalizer configured to adjust a data signal,
   wherein the equalizer is configured to compensate for frequency attenuation of the second receive signal received from an analog circuit so as to be provided to the sampler.

6. The electronic circuit of claim 1, wherein the statistical characteristic includes a probability distribution characteristic indicating a difference from a normal distribution.

7. The electronic circuit of claim 6, wherein the metric calculator is configured to calculate the metric value associated with each of the plurality of the sample data, by using an approximation function or a tendency function for the metric value indicating the probability distribution characteristic.

8. The electronic circuit of claim 7, wherein the accumulator is configured to accumulate the metric value associated with each of the plurality of the sample data to calculate a cumulative value and normalize the cumulative value to a sample data count to output the output value.

9. The electronic circuit of claim 1, wherein the decision logic is configured to:
   determine a maximum value or a minimum value of output values of the accumulator respectively corresponding to the plurality of loops; and
   estimate a timing delay of a loop corresponding to the maximum value or the minimum value as the timing skew.

10. The electronic circuit of claim 9, further comprising:
    a loop filter configured to filter specific frequency components of the compensation signal,
    wherein the decision logic is configured to output, to the delay circuit, the compensation signal for compensating for the timing delay estimated as the timing skew through the loop filter.

11. The electronic circuit of claim 10, wherein the delay circuit is configured to output a final reference signal obtained by delaying the first receive signal based on the compensation signal, and
    wherein the sampler is configured to sample the second receive signal based on the final reference signal, so as to be output as reception data.

12. An electronic circuit comprising:
    a plurality of sub electronic circuits configured to convert a receive signal being analog into reception data being digital,
    wherein each of the plurality of sub electronic circuits includes:
    a delay circuit configured to receive a first receive signal and to output a reference signal, the reference signal being generated by delaying the first receive signal as much as one or a plurality of different timing delays respectively set to a plurality of loops;
    a sub analog-to-digital converter (sub-ADC) configured to receive a second receive signal and to sample the second receive signal based on the reference signal in each of the plurality of loops;
    an estimation circuit configured to output a compensation signal for compensating for a timing skew by extracting a statistical characteristic of sample data sampled through the sub-ADC and estimating the timing skew based on the statistical characteristic; and
    a loop filter configured to filter specific frequency components of the compensation signal.

13. The electronic circuit of claim 12, wherein the estimation circuit includes:
    a metric calculator configured to calculate a metric value indicating the statistical characteristic of the sample data;
    an accumulator configured to accumulate the metric value; and
    decision logic configured to estimate the timing skew based on an output value of the accumulator.

14. The electronic circuit of claim 13, wherein the statistical characteristic includes a probability distribution characteristic indicating a difference from a normal distribution.

15. An operation method of an electronic circuit which estimates a timing skew, the method comprising:
- receiving a first receive signal and a second receive signal;
- generating a first reference signal by delaying the first receive signal as much as a first time;
- generating first sample data by sampling the second receive signal based on the first reference signal;
- generating a first output value based on a metric indicating a statistical characteristic of the first sample data;
- generating a second reference signal by delaying the first receive signal as much as a second time;
- generating second sample data by sampling the second reference signal based on the second reference signal;
- generating a second output value based on the metric indicating the statistical characteristic with respect to the second sample data;
- estimating the first time or the second time as the timing skew by comparing the first output value and the second output value; and
- compensating for the timing skew to output final sample data.

16. The method of claim 15, wherein the metric reflects the statistical characteristic including a probability distribution characteristic indicating a difference from a normal distribution.

17. The method of claim 15, wherein the generating of the first output value includes:
- accumulating metric values of the first sample data according to the metric to generate the first output value, and wherein the generating of the second output value includes:
- accumulating metric values of the second sample data according to the metric to generate the second output value.

18. The method of claim 17, wherein the estimating of the first time or the second time as the timing skew includes:
- determining a smaller value of the first output value and the second output value; and
- estimating a timing delay of a reference signal corresponding to the smaller value of the first output value and the second output value as the timing skew.

19. The method of claim 15, wherein the outputting of the final sample data includes:
- generating a final reference signal by delaying the first receive signal as much as the first time or the second time; and
- outputting the final sample data by sampling the second receive signal based on the final reference signal.

* * * * *